Oct. 27, 1953 B. OSTENDORF, JR., ET AL 2,657,336
COMMUNICATION SIGNAL LAMP CONTROL CIRCUIT
Filed July 19, 1951
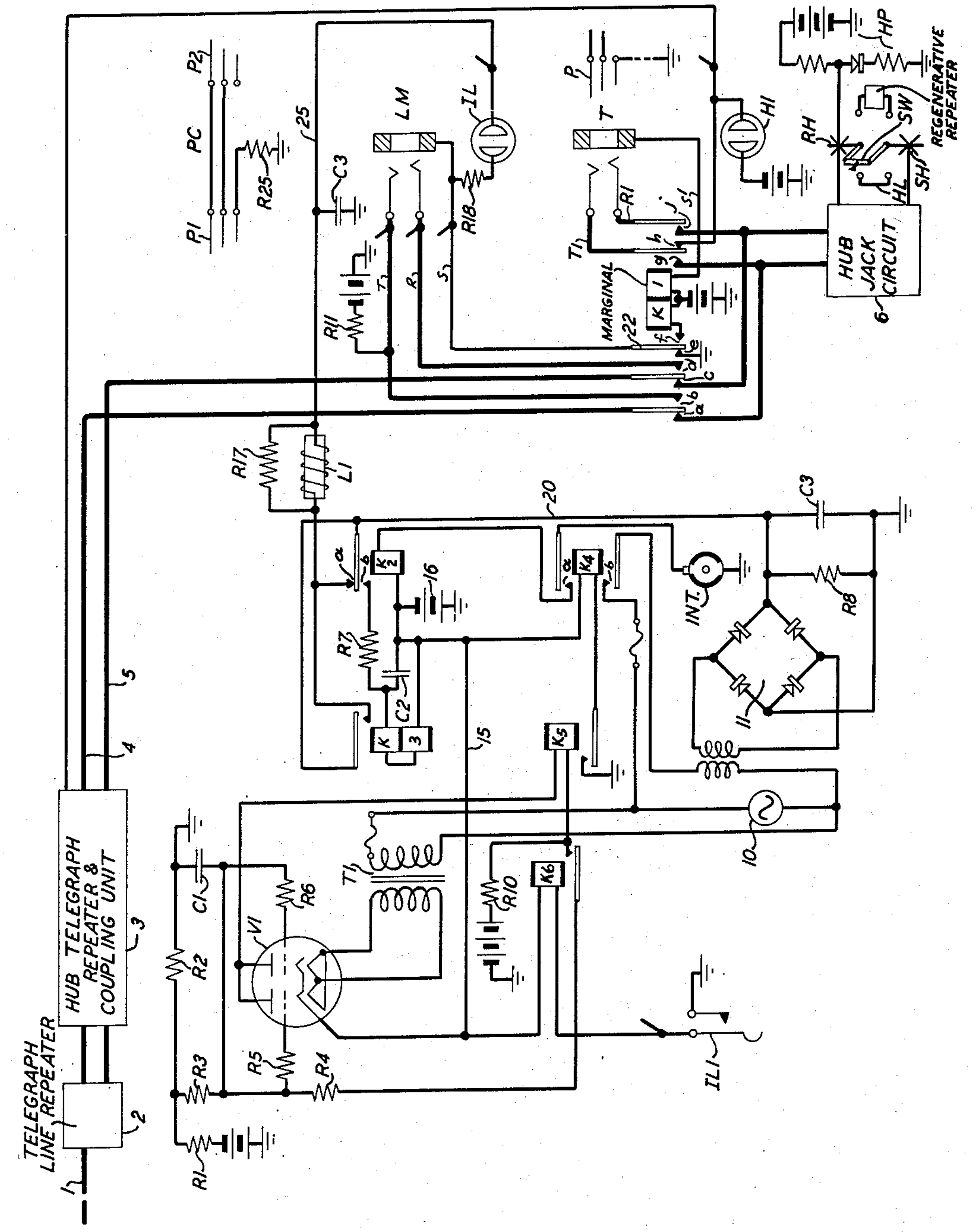
INVENTORS B. OSTENDORF, JR.
R. A. VANDERLIPPE
BY John E. Cassidy
ATTORNEY Patented Oct. 27, 1953 2,657,336

UNITED STATES PATENT OFFICE 2,657,336

COMMUNICATION SIGNAL LAMP CONTROL CIRCUIT

Bernard Ostendorf, Jr., Stamford, Conn., and Richard A. Vanderlippe, Bloomfield, N. J., assignors to Bell Telephone Laboratories, Incorporated, New York, N. Y., a corporation of New York Application July 19, 1951, Serial No. 237,506

6 Claims. (Cl. 315—209)

This invention is an improved control circuit for a space discharge device. More specifically it is an improved signaling circuit wherein a space discharge device, such as an inert gas lamp is employed as a signal. Yet more specifically this invention is an improved idle indicating circuit such as is employed, for instance, in cooperation with communication circuits to indicate idle circuits available at the moment for selection by an operator.

An object of the invention is the improvement of control circuits for space discharge devices. A more specific object is the improvement of signaling circuits, such as idle indicating circuits, in which a space discharge lamp, such as an inert gas lamp, is employed as a signal.

There are a number of advantages to be had in the employment of space discharge lamps, such as neon or other inert gas lamps, as signals in various signaling circuits, particularly in idle indicating circuits, employed, for instance, to indicate, to operators at manual switchboards, circuits which are available at the moment for selection as communication paths to distant cities. Among these advantages are that they are relatively inexpensive in first cost, have a longer life and are low in current consumption. This latter factor is of considerable importance. As is well understood, current drain on the battery of a communication office is a factor which is evaluated closely against the service thereby afforded. The advantage of speed in operation afforded by a substantially instantaneous indication of all circuits presently available in the switchboard to a particular destination, by means of an idle indicating circuit, which, for instance, lights a lamp associated individually with each idle circuit for an interval, must be weighed against a method of testing each trunk individually in succession by means of the well-known busy test or by other methods, which methods are not quite so fast or convenient. One of the important factors in the comparison is the current drain of the required lamps and the matter of such drain at times of commercial power service failure when all of the communication circuits in the office are required to be supplied from the emergency or standby battery may be critical.

There are difficulties inherent in the employment of lamps such as neon lamps in signaling. The chief of these is their tendency to flicker. A signal lamp to be satisfactory in communication service must afford a positive indication of the condition which it is its function to indicate. If, for instance, a lighted lamp indicates available circuits and a non-lighted lamp the opposite, a lamp which flickers momentarily when it should extinguish is unsuitable for the purpose.

At telephone and telegraph trunk boards as well as at telegraph service boards wherein, for instance, there may be many positions in the same line-up of switchboards, two operators at New York, for instance, may require a circuit to Chicago at substantially the same moment. Each presses the idle indicating key at her position. A number of lamps, ten for instance, individually associated with each idle circuit to Chicago light at the two positions. There will inevitably be a certain few double connections due to simultaneous selection, say in the same hundredth of a second, of the same idle circuit by two operators at different positions. This is assuming the usual incandescent type lamp. The number of double connections has been very materially increased, however, when lamps, such as neon or other inert gas lamps, have been tried in service to perform this function, because of flicker or persistence of illumination after disconnection of power. Therefore, notwithstanding their desirability from other standpoints, it has not been possible to employ such lamps in such service.

The present invention overcomes this difficulty and it may be understood from a consideration of the following description when read with reference to the associated drawing which, taken together, disclose a preferred embodiment in which the invention is presently incorporated although it is to be understood that the invention may be incorporated in other embodiments which will be readily suggested to those skilled in the art by the following:

In the drawing, a telegraph channel 1, which connects to a distant station, is shown connected through a telegraph line repeater 2 and hub telegraph repeater coupling unit 3, both well known in the art, receiving leg 4 and sending leg 5, contacts *a* and *c*, respectively, of relay K1, when relay K1 is released as shown, and hub jack circuit 6, also well known in the art, to receiving hub RH and sending hub SH, respectively. The hubs are connected to the blades of a double-pole, double-throw switch SW by means of which they may be interconnected, when the switch is in a first position, through the hub link HL to form a single electrical point or hub, or, when the switch is in a second position, through the regenerative repeater, in which case a delay is interposed between the reception of an incoming signal on the receiving hub and its transmission to the receiving hub as is well known in the art. A number of receiving legs of other repeaters and their associated sending legs, indicating by straps radiating from the respective hubs, are interconnected through the hubs to form a concentration group. As thus arranged, any individual circuit, such as circuit 1, interconnected through the hub can transmit to all of the others simultaneously in a well-known manner and over the other circuits, such as circuit 1, to similar concentration groups in distant cities.

Hub concentrations are employed to serve the various units of a large corporation, for instance, in private wire service, as distinguished from teletypewriter exchange service and other types of service. The telegraph lines connected into a hub may remain so interconnected for long intervals, such as for days or weeks at a time. At times, however, it is necessary to change the components of a concentration group, to add lines to the group or to substitute a line for another line in the group, and provision is made in the circuit arrangement to permit this.

The switchboard wherein the hub concentration groups are administered is a special board known as a telegraph service board. The kind of board, such as the present board, in which an idle circuit indicator is ordinarily employed is a multiple position board. Each of the telegraph lines coming into the switchboard has a number of outlets, each called a multiple appearance, within reach of each operator in the switchboard line-up. The operator at each position must have some means of identifying such lines as are available to particular distant cities when one is required to be connected into a concentration. One means of doing this is by means of an idle indicating circuit of which there are a number known in the art. The present invention affords an improved idle indicator circuit which makes it possible to take advantage of the desirable characteristics of an inert gas lamp by eliminating its disadvantage.

When any line which ordinarily is connected into a concentration group in the manner described in the foregoing is to be disconnected from a concentration group and made available for interconnection into another concentration group, a release plug, such as P, having ground connected to the sleeve circuit thereof, is connected to the jack A associated with the line which is to be disconnected from a group. This establishes a circuit from ground on the sleeve of the plug, through the sleeve circuit of jack T and the right-hand winding of relay K1 operating the relay which by opening contacts *a* and *c* disconnects line 1 from the concentration with which it is ordinarily associated and by closing its contacts *b* and *d* connects receiving leg 4 and sending leg 5 of line 1 to the tip and ring circuit of line multiple jack LM. The tip ring and sleeve conductors connected to jack LM are connected in parallel to a member of corresponding jacks so that a jack giving access to line 1 is within reach of each operator in the board. This multiple connection is indicated by straps or spurs connected to each of the three conductors at jack LM.

If now an operator requires a line to a distant city, such as Chicago, for connection into a particular concentration group at her position she will make use of the idle indicator control circuit. To do this she actuates idle indicator control key OL1 one of which appears at each operator's position.

The multipled keys are indicated by a strap.

*Timing circuit*

Power, for instance, 110-volt, 60-cycle alternating current is connected to the idle indicator circuit from alternating-current source 10, which connects through transformer T1 to the heater elements of the indirectly heated double triode V1, and after relay K4 is operated, in a manner to be described, through the full wave dry rectifier bridge 11, the output of which is connected across resistor R8 which is shunted by filtering condenser C3.

Where the magnitude of constants are given in the following description, it is to be understood that the values cited are by way of example as an aid in understanding the operation of the invention and the particular values mentioned are not to be interpreted as limitations.

Normally, condenser C1 is charged to −100 volts in a circuit which extends from negative battery through resistor R1 and resistor R2 to the upper terminal of condenser C1 and ground and from the junction of resistors R1 and R2 through resistor R3 to the lower terminal of condenser C1. The lower terminal of condenser C1 is connected through resistors R5 and R6 in parallel to the grids of double triode V1 which is thereby maintained inactivated for this condition. Operation of key IL1 establishes a circuit from ground through the key contacts, winding of relay K6 and conductor 15 to battery 16 operating relay K6. With relay K6 operated a circuit is established from positive battery through battery tap resistor R10, contact of relay K6 and resistor R4 to the bottom terminal of resistor R3 and the lower plate of condenser C1. Condenser C1 charges rapidly to +130 volts. Tube V1 thereby conducts through both its right- and left-hand sections which are connected in parallel. This establishes a circuit from positive battery through resistor R10, winding of relay K5, anodes and cathodes of tube V1 and conductor 15 to negative battery actuating relay K5. The operation of relay K5 in turn establishes a circuit from ground through the contact of relay K5 and the winding of relay K4 to battery 16 operating relay K4 which connects the power source 10 through its contacts *b* to the rectifier 11.

To anticipate, after key IL1 is released, relay K6 releases and condenser C1 slowly charges in the negative direction. After approximately nine seconds the grid of tube V1 is sufficiently negative to cut it off causing relay K5 to release which in turn causes the power supply relay K4 to release disconnecting the 115-volt 60-cycle supply from the input of the power rectifier and the circuit returns to normal.

*Interrupter circuit*

While relay K4 is activated a direct-current potential of positive 55 volts with respect to ground potential, for instance, is supplied in a circuit which may be traced from the ungrounded side of resistor R8 by way of conductor 20 to the armature of each of relays K2 and K3. A circuit may be traced from ground through interrupter INT, which makes and breaks the circuit for quarter-second intervals each, through contact *a* of relay K4 and the winding of relay K2 to battery operating relay K2 for an interval of one-quarter second each half second. At the beginning of every half-second cycle relay K2 is operated. This extends the battery supply circuit from conductor 20 through contact *b* of relay K2, resistor R7 and the top and bottom windings of relay K3 to negative battery 16. The windings of relay K3 are shunted by condenser C2 which together with resistor R7 constitute a delay circuit which delays the operation of relay K3 for an interval such as ten milliseconds after which the battery supply circuit is extended through the contact of relay K3 and inductance L1 and resistor R17 in parallel to the right-hand terminal of inert gas idle indicating lamp IL. Depending on whether the circuit 1 is busy or idle direct ground through contact *e* of relay K1, or negative battery through the left-hand winding and contact *f* of relay K1, respectively, will be connected through armature 22 of relay K1 and resistor R18 to the left-hand terminal of lamp IL. If the line 1 is connected into its normally assigned hub concentration, relay K1 is released and armature 22 is connected through contact *e* of relay K1 to ground. Lamp IL which for this example has an ionizing potential greater than 55 volts, does not light for this condition. If line 1 has been released from its normal assignment by operation of relay K1 on its right-hand winding as previously explained, armature 22 is connected through contact *f* of relay K1 and the left-hand winding of relay K1 to negative 48-volt battery. For this condition the potential across lamp IL is the arithmetic sum of the 48-volt battery and the potential appearing on lead 25; hence lamp IL will be lighted whenever relay K3 is operated or relay K2 is unoperated. Once operated, relay K3 will remain operated during the remainder of the quarter-second interval while relay K2 remains operated. After ground is disconnected by the interrupter and relay K2 starts to release, relay K3 will hold for an interval at least as long as required for the transition of the armature of relay K2 from its contact *b* to its contact *a*. Then the supply circuit will be extended through contact *a* of relay K2 for one-quarter second per cycle.

The net result of the operation of relays K2 and K3 is that in each half-second cycle of interrupter INT the positive 55-volt rectifier supply is disconnected from the right-hand terminal of lamp IL for a predetermined short interval, such as for ten milliseconds, as determined by the constants of the delay circuit, resistor R7 and capacitance C2. The operation of idle lamp indicator key IL1 effects the connection of a direct-current potential of positive 55-volts through conductor 20 for an interval of nine seconds duration as heretofore explained. This supply is interrupted for ten milliseconds every half second during the interval while relay K2 is operated to open contact *a* and before relay K3 is operated to close its contact. If circuit 1 is idle and is selected by an operator at some switchboard position, in response to the lighting of its lamp IL at any position, the operator inserts plug P1 of the patching cord PC into jack LM of circuit 1 and patches plug P2 of cord PC to the jack T of a line forming part of the particular concentration group to which line 1 is to be joined. A low resistance ground through resistor R25 on the sleeve of the P1 plug of patching cord PC reduces the potential of the left-hand terminal of lamp IL to near zero. If lamp IL has a sustaining potential requirement of more than the 55 volts assumed for this example it will be extinguished immediately upon connection of plug P1 to jack LM. If, however, due to aging of the lamp or any other reason the sustaining potential exceeds 55 volts, the lamp will be extinguished when the potential of lead 25 is reduced to zero for the short interval previously described; thus the accuracy of the idle indication is not restricted by variations in the sustaining potential of the indicator lamp IL.

A second purpose of the ground applied through resistance R25 to the sleeve of the LM jack is to complete a circuit path which may be traced from battery on the left winding of relay K1 through contacts *f* of relay K1, the sleeve of jack LM and resistor R25 to ground. Current flowing in this path will hold relay K1 operated even though plug P is removed from jack T. This arrangement prevents the inadvertent disconnection of circuit 1 from its assignment by way of patch cord PC to another concentration group.

It has been found that the effect of the opening of the lamp circuit for a period of 10 milliseconds every half second cannot be observed visually. However, it insures the rapid extinction of lamp IL when the circuit is seized and thus prevents flicker and double connections.

What is claimed is:

1. A space discharge device, a battery supply circuit connected to said device to light said device for a first interval as a signal, an interrupter in said battery supply circuit and a timing circuit control connected to said interrupter for interrupting said supply for a second interval during said first interval, said second interval shorter in duration than is manifest visually to minimize flicker.

2. A space discharge lamp, a battery supply connected thereto to light said lamp, an interrupter in said supply, said interrupter having a control and timing means therefor actuable to interrupt said supply for an interval shorter in duration than is observable visually.

3. An inert gas lamp, a battery supply therefor connected thereto, an interrupter in said supply, a first control connected to said interrupter, a first timer connected to said control, a second timer and a second control therefor connected to said battery supply for activating said battery supply for a first interval measurable in seconds, and means responsive to said first timer and said first control for actuating said interrupter to interrupt said supply, during said first interval, for a second interval measurable in milliseconds.

4. An inert gas lamp, a battery supply circuit for said lamp extending through an interrupter and through a contact of a switch controlled by said interrupter to said lamp, said circuit continuous through said interrupter while said interrupter is in a first condition at a first time, said circuit discontinuous while said interrupter is in a second condition at a second time, said circuit continuous through said contact after an interval measurable in milliseconds at a third time, and a delay circuit connected to said switch for preventing the closure of said contact for said interval.

5. An inert gas lamp, a battery supply circuit therefor extending through an interrupter, through a contact of a first switch connected to and actuated by said interrupter and thereafter through a contact of a second switch connected to and operated in response to the operation of said first switch after a predetermined delay measured by a timing circuit connected to said first and said second switches directly.

6. An idle indicator control circuit having an inert gas lamp for indicating the condition of circuits available for use, a battery supply circuit connected to said lamp, and means for insuring the rapid extinction of said lamp and minimizing flicker to prevent double connections, said means comprising an interrupter in said battery supply circuit and a control for said interrupter for interrupting said supply for a predetermined interval of duration during a lighted interval of said lamp, said predetermined interval of sufficiently short duration to prevent visual manifestation thereof in said lamp when lighted.

BERNARD OSTENDORF, Jr.
RICHARD A. VANDERLIPPE.

References Cited in the file of this patent

UNITED STATES PATENTS

| Number | Name | Date |
|---|---|---|
| 2,070,623 | Saterlea | Feb. 16, 1937 |
| 2,186,013 | Edgerton | Jan. 9, 1940 |
| 2,473,625 | Wheeler | June 21, 1949 |